United States Patent [19]

Hosoi et al.

[11] Patent Number: 4,486,280

[45] Date of Patent: Dec. 4, 1984

[54] SELF-CURING MODIFIED EPOXY RESIN COMPOSITION AND AQUEOUS DISPERSION THEREOF

[75] Inventors: Fumio Hosoi; Takashi Sasaki; Miyuki Hagiwara; Shigenori Egusa; Kiyoshi Nanishi, all of Gunma, Japan

[73] Assignee: Japan Atomic Energy Research Institute, Tokyo, Japan

[21] Appl. No.: 508,564

[22] Filed: Jun. 28, 1983

[30] Foreign Application Priority Data

Aug. 30, 1982 [JP] Japan ............................. 57-150271

[51] Int. Cl.$^3$ ...................... C08F 283/10; C08F 2/52; C08L 63/10
[52] U.S. Cl. ............................. 204/159.11; 523/414; 525/530; 525/531; 528/114
[58] Field of Search ................ 523/414; 525/530, 531; 204/159.11, 159.18; 528/114

[56] References Cited

U.S. PATENT DOCUMENTS

| | | | |
|---|---|---|---|
| 2,824,851 | 2/1958 | Hall | 525/531 |
| 3,839,252 | 10/1974 | Busso | 523/414 |
| 3,912,608 | 10/1975 | Marans | 525/530 |
| 3,976,615 | 8/1976 | Sekmakas | 525/531 |
| 4,028,294 | 6/1977 | Brown | 525/531 |
| 4,081,492 | 3/1978 | Traenckner | 525/531 |
| 4,101,398 | 7/1978 | Hesse | 525/531 |
| 4,102,942 | 7/1978 | Smith | 525/531 |
| 4,111,770 | 9/1978 | Najavar | 525/530 |
| 4,156,035 | 5/1979 | Tsao | 204/159.11 |
| 4,212,781 | 7/1980 | Evans | 523/414 |
| 4,308,185 | 12/1981 | Evans | 525/530 |
| 4,387,011 | 6/1983 | Makuuchi | 525/531 |
| 4,443,568 | 4/1984 | Woo | 525/531 |

FOREIGN PATENT DOCUMENTS

| | | |
|---|---|---|
| 53-1228 | 9/1978 | Japan . |
| 56-32551 | 4/1981 | Japan . |

OTHER PUBLICATIONS

Abstract of Japanese Kokai, 6032-551, published Apr. 2, 1981.

*Primary Examiner*—C. Warren Ivy
*Attorney, Agent, or Firm*—Browdy and Neimark

[57] ABSTRACT

A self-curing epoxy resin composition is, herein, disclosed produced by irradiating with an electron beam a mixture of 85 to 97 wt % of an epoxy resin and 3 to 15 wt % of a quaternary alkyl ammonium salt of $\alpha,\beta$-unsaturated carboxylic acid or a neutralized product of an $\alpha,\beta$-unsaturated carboxylic acid and a tertiary amine.

16 Claims, No Drawings

SELF-CURING MODIFIED EPOXY RESIN COMPOSITION AND AQUEOUS DISPERSION THEREOF

FIELD OF THE INVENTION

The present invention relates to a self-curing epoxy resin composition and an aqueous dispersion thereof. More particularly, the invention relates to a self-curing epoxy resin composition produced by irradiating with an electron beam a mixture of an epoxy resin and a quaternary alkyl ammonium salt of an $\alpha,\beta$-unsaturated carboxylic acid or a neutralized product of an $\alpha,\beta$-unsaturated carboxylic acid and a tertiary amine. The invention also relates to an aqueous dispersion of said self curing epoxy resin composition.

BACKGROUND OF THE INVENTION

Epoxy resins have good mechanical properties, high resistance to heat and chemicals, and provide high bond strength, and hence, they are widely used as thermosetting resins for use in laminated sheets, adhesives or paints. Thin films have been conventionally prepared from synthetic resins such as epoxy resins by dispersing them in organic solvents, but with the current concern over pollution control and resources saving, active efforts are being made in various fields to develop water-dispersible resins.

Two methods for dispersing synthetic resins in water have been proposed; they are (1) the mechanical emulsification method wherein the resin is emulsified in a water-base medium in the presence of a surfactant, and (2) the hydrophilic group grafting method wherein a polymerizable hydrophilic vinyl compound is grafted onto the resin. The first method is currently used to make an aqueous dispersion of epoxy resins, but this method has the following disadvantages: (1) the epoxy resin is unstable and easily separates from water; (2) the epoxy resin is not uniformly dispersed in water, so that the subsequent curing reaction does not proceed evenly and a product of good performance is not obtained; (3) since the surfactant is used in a large amount, the thin film produced has low water resistance and bond strength, and furthermore, the residual surfactant dissolves out of the thin film into water. The second method is a rather recent technique (see Japanese Patent Public Disclosure No. 1228/78) which consists of producing an aqueous dispersion by neutralizing the hydrophilic groups in the graft molecule with alkali or acid. But this method also has the following defects: (1) the reaction requires a large amount of organic solvent, and the residual monomer is difficult to remove; (2) the grafting efficiency is so low that the ungrafted polymer easily separates from the grafted polymer; (3) since the neutralization step follows the grafting of hydrophilic groups, the epoxy resin is not uniformly dispersed in water and easily separates from water; (4) because of reason (3), the subsequent curing reaction does not proceed evenly and a product of good performance is not obtained.

Therefore, it will be of great benefit for the industry to establish a method for synthesizing a chemically stable water-dispersible epoxy resin composition that has high resistance to water and solvents, as well as good physical properties.

SUMMARY OF THE INVENTION

A primary object of the present invention is to provide a self-curing, water-dispersible epoxy resin composition by irradiating a mixture of an epoxy resin and a radical polymerizable unsaturated monomer with an electron beam.

This object can be attained by forming a mixture of a solid or liquid epoxy resin and a quaternary alkyl ammonium salt of an $\alpha,\beta$-unsaturated carboxylic acid into a suitable shape, and irradiating said mixture with an electron beam to graft said unsaturated monomer to the epoxy resin. The same object can be attained by adding a tertiary amine to a mixture of epoxy resin and $\alpha,\beta$-unsaturated carboxylic acid to form a neutralized product of the $\alpha,\beta$-unsaturated carboxylic acid, forming said mixture into a suitable shape, and irradiating the mixture with an electron beam to graft the unsaturated monomer to the epoxy resin.

Making a quaternary salt of carboxyl groups in a resin with a tertiary amine or the like is a well known method for making the resin soluble in water. So, an epoxy resin can be rendered water-dispersible by first grafting an $\alpha,\beta$-unsaturated carboxylic acid to the epoxy resin with heat or by exposure to ionizing radations such as an electron beam, and then neutralizing the carboxylic acid with an aqueous alkali such as amine. But the epoxy resin thus produced cannot uniformly be dispersed in water, and because of the presence of irregularly sized particles, the dispersion has a very poor keeping quality and the subsequent curing reaction proceeds unevenly to produce only a product having low resistance to water and solvents, as well as poor physical properties. We have made various studies to unravel the mechanism behind this phenomenon and found the following: a modified epoxy resin having an unsaturated carboxylic acid grafted thereto can be rendered water-dispersible by first dissolving the epoxy resin or causing it to swell in a small amount of solvent, then adding an aqueous alkali to the resin, and in this case, the size of the dispersible epoxy resin particles is determined at the time when the resin is dissolved or caused to swell in the solvent. Based on this finding, we continued our studies and speculated that in order to eventually produce an aqueous dispersion of epoxy resin having a uniform particle size, long keeping quality and from which a thin film having good physical properties can be made, it would be necessary to graft to the epoxy resin a hydrophilic unsaturated monomer that would easily separate from the epoxy resin when it was dissolved or caused to swell in a solvent. We developed this speculation and grafted an ethylenically unsaturated monomer containing a quaternary alkyl ammonium salt of $\alpha,\beta$-unsaturated carboxylic acid to an epoxy resin by irradiating said epoxy resin with an electron beam while it is in contact with the monomer. In spite of our assumption that an amine would serve as a curing agent for the epoxy resin, the graft polymer did not gel and could be used to produce an aqueous dispersion having long keeping quality and a narrow particle size distribution. Furthermore, this aqueous dispersion exhibited good self curing properties upon heating. The same results could be obtained by first mixing the epoxy resin with an ethylenically unsaturated monomer containing an $\alpha,\beta$-unsaturated carboxylic acid, adding a tertiary amine to the mixture to neutralize the $\alpha,\beta$-unsaturated carboxylic acid, and effecting graft polymerization of the mixture by irradiation with an electron beam. This finally led us to the present invention which is described hereunder.

DETAILED DESCRIPTION OF THE INVENTION

Most basically, the water-dispersible, self-curing epoxy resin composition of the present invention is produced by a process which consists of mixing an epoxy resin (hereunder sometimes referred to as component A) with a quaternary alkyl ammonium salt of an α,β-unsaturated carboxylic acid or a neutralized product of α,β-unsaturated carboxylic acid and a tertiary amine (said ammonium salt or neutralized product is hereunder sometimes referred to as component B), shaping the mixture into a suitable form, and irradiating the so shaped mixture with an electron beam to graft component B onto component A. The same result can be obtained by performing graft copolymerization with exposure to an electron beam after adding to the mixture of components A and B a polymerizable monomer having one ethylenically unsaturated bond in the molecule (hereunder sometimes referred to as component C). Component C is added to increase the solubility of component B in component A. By using component C, the efficiency of grafting component B onto component A is increased and the production of the desired water-dispersible resin composition is facilitated. Therefore, the use of component C is included in the scope of the present invention. Component B is soluble only in water or a polar solvent such as alcohol, so mixing components A and B in the presence of a small amount of an organic solvent is important for aiding in the dissolution of component B in A.

According to the present invention, when the mixture of components A and B is irradiated with an electron beam, part of component B is grafted onto component A, forming a solid product wherein microfine particles of the graft polymer, ungrafted polymer and ungrafted epoxy resin are uniformly dispersed. The "graft polymer" is the epoxy resin onto which the quaternary alkyl ammonium salt or neutralized product of α,β-unsaturated carboxylic acid is grafted. The graft polymer acts as an emulsifier and aids in forming a stable dispersion of the ungrafted epoxy resin in an aqueous solvent. The "ungrafted polymer" is a product formed by addition polymerization, rather than graft polymerization, of the monomer. The ungrafted polymer is soluble or dispersible in water. Therefore, the resin composition resulting from irradiation of the above defined mixture with an electron beam is wholly made of water-dispersible components.

The epoxy resin as used in the present invention may be selected from among known epoxy resins typically exemplified by "bisphenol A type" diglycidyl ether having the formula given below:

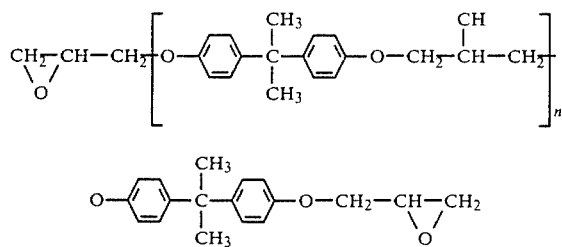

-continued
(usually n = 0–8)

Preferably, the epoxy resin contains at least one methylene or ethylene group but does not contain a nonaromatic carbon-carbon double bond in the molecule. This is in order to increase the efficiency of grafting that is initiated by irradiation with an electron beam and to prevent undesired crosslinking.

The quaternary alkyl ammonium salt of α,β-unsaturated carboxylic acid which is used as component B is an ammonium salt formed by reacting a quaternary alkyl ammonium salt wherein the alkyl group is methyl or ethyl, with an α,β-unsaturated carboxylic acid, and it is exemplified by the following formula:

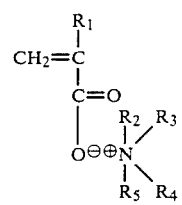

(wherein $R_1$ and $R_2$ are each a hydrogen atom or an alkyl group; $R_3$ to $R_5$ are each an alkyl group). Illustrative quaternary alkyl ammonium salts of α,β-unsaturated carboxylic acid include tetramethyl ammonium acrylate, tetramethyl ammonium methacrylate, monomethyltetramethyl ammonium itaconate, monobutyltetramethyl ammonium itaconate, monomethyltetramethyl ammonium maleate, ditetramethyl ammonium maleate, tetraethyl ammonium acrylate, tetraethyl ammonium methacrylate, monomethyltetraethyl ammonium itaconate, ditetraethyl ammonium itaconate, monotetraethyl ammonium maleate and ditetraethyl ammonium maleate.

The neutralized product of α,β-unsaturated carboxylic acid which may be used as component B is a neutralized salt produced by mixing an α,β-unsaturated carboxylic acid such as acrylic or methacrylic acid with a tertiary amine such as triethylamine, tripropylamine, dimethylaminoethanol or diethylaminoethanol. Component B dissociates in the presence of water and provides a negative charge for the graft polymer chain or ungrafted polymer chain. Component B is contained in the epoxy resin composition of the present invention in an amount of 3 to 15 wt%, preferably 3 to 10 wt%, of the composition. If the amount of component B is less than 3 wt%, the resulting composition is difficult to disperse in water, and if the amount is more than 15 wt%, a stable aqueous dispersion cannot be formed.

Optional component C or the polymerizable ethlenically unsaturated monomer is desirably miscible with the epoxy resin since it is used to promote the dissolution of component B in the epoxy resin. Examples of component C are styrene, β-methoxystyrene and α-methylstyrene; unsaturated carboxylic acids such as acrylic acid and methacrylic acid; acrylate esters, methacrylate esters, acrylonitrile and methacrylonitrile. Component C is contained in the resin composition of the present invention in a significant amount not more than 48 wt%. If the content of component C exceeds 48 wt%, the viscosity of the system made of components A, B and C is reduced to such an extent that the amount of an electron beam necessary for completing the polymerization is greatly increased and undesired side reactions such as cross-linking proceed to an appreciable degree. The decrease in the viscosity of the system may be prevented by holding the system temperature at −50° C. or lower with a cooler, but in consideration of heat generation resulting from the irradiation with an electron beam, the cooling requires much cost and energy while significantly reducing the rate of polymerization.

When component C is used in the present invention, a mixture of components A and C is first prepared, and then component B is added. If an epoxy resin having a low molecular weight hence a low viscosity is used as component A, it may be mixed with component C in a conventional stirrer at 60°–70° C. If an epoxy resin having a high molecular weight and high viscosity is used, the mixing should be effected in a kneader, optionally at an elevated temperature not higher than 100° C. When component B is added to the mixture of components A and C, the mixture is preferably held at a temperature not higher than 40° C. in order to prevent the reaction between the epoxy group and ammonium salt. Most ammonium salts are soluble only in water or a polar solvent such as alcohol, so a small amount of solvent may be added as a very effective agent to achieve uniform mixing. The addition of component B to the mixture of components A and C may be effected in the presence of an inert gas to accelerate the subsequent polymerization by exposure to an electron beam.

The mixture of components A, B and C is formed into a sheet 0.1 mm thick and is sandwiched between polyester films for subsequent irradiation with an electron beam. The overall thickness of the sheet is determined by the range of electron beams issued from the accelerator used. The sheet is irradiated with an electron beam at a dose of $1 \times 10^4$ to $3 \times 10^7$ rad/second, preferably 0.5 to 25 Mrad/second, to give a total dose of 5 to 50 Mrad. The irradiation temperature is between −50° and 50° C. Cooling the sheet to a temperature lower than −50° C. is not only costly but reduces the reaction rate. A temperature higher than 50° C. may cause the undesired cross-linking reaction. The exact dose of radiation should be determined by the capabilities of the specific accelerator used. If the total dose of radiation is less than 5 Mrad, the amount of the residual monomer is increased, and a total dose of more than 50 Mrad is unnecessary and may cause an undesired effect such as cross-linking. The solid product produced by irradiation with an electron beam is ground by a suitable method into fine particles having an average size of 1 mm or less. The particles are then dissolved or caused to swell in an organic solvent and mixed with water under stirring to provide an aqueous dispersion. Suitable organic solvents are n-butanol, cyclohexanone, butyl cellosolve and tetrahydrofuran, which may be used either alone or in combination. If two or more solvents are used, their proportions are determined by the proportions of components B and C. The organic solvents are generally used in an amount of 30 to 100 parts by weight per 100 parts by weight of the epoxy resin.

The mixture of components A, B and C is preferably dissolved in the organic solvent and dispersed in water at a temperature of 50° C. or below because the modified epoxy resin composition according to the present invention is essentially self-curing. The amount of water used as a dispersion medium is 30 to 1,000 parts by weight, preferably 100 to 70 parts by weight, per 100 parts by weight of the powder.

The epoxy resin modified by irradiation with an electron beam has so high an emulsifying ability that it is capable of dispersing an unmodified epoxy resin if it is intimately blended with the modified epoxy resin powder, followed by dissolution or swelling in an organic solvent, and dispersion in water under stirring. The amount of an untreated epoxy resin that can be dispersed in water together with the modified epoxy resin depends on the structure and amount of component B and the irradiation conditions. Usually, 20 to 300 parts by weight of the unmodified epoxy resin can be dispersed together with 100 parts by weight of the modified epoxy resin.

The epoxy resin composition of the present invention is given the self-curing properties by using component B, so another meritorious feature of the composition is that its aqueous dispersion can be subsequently cured in the absence of a curing accelerator. Needless to say, the rate of curing may be increased by a known method such as adding a small amount of a curing accelerator, for example, a water-soluble amino resin.

The advantages of the present invention will become more apparent by reading the following examples which are given here for illustrative purposes only.

EXAMPLES 1 AND 2

An epoxy resin (Epikote 1007 of Shell Chemical Co.) was comminuted into particles smaller than 200 mesh. A hundred grams of the powder, as well as methanol and tetramethyl ammonium methacrylate (for their amounts see Table 1) were charged into a four-necked glass flask (300 ml capacity) equipped with a stirrer, a nitrogen gas introducing pipe, a thermometer and a cooling pipe. Under cooling with water, the components were mixed at room temperature for one hour until two uniform mixtures were obtained. Each mixture was sealed in a polyethylene bag and irradiated on an ice bath with an electron beam from a Dynamitron (radiation energy: 2 MeV, current: 6 mA) to form a solid product. The percent conversion of the monomer in each sample is listed in Table 1.

Fifty grams of each solid product was put in a cylindrical flask (300 ml capacity) and mixed with 35 g of a butanol-cyclohexanone-butyl cellosolve solvent (2:1:1 by weight) by a 4-blade stirrer. To the resulting solution, 115 g of water was gradually added under stirring, and the mixture was vigorously agitated to form an aqueous dispersion. Each of the so prepared aqueous dispersions had the properties indicated in Table 1. No precipitate formed when the dispersions were left to stand at 25° C.

TABLE 1

| | composition (g) | | | | | properties of dispersions | | |
| | | tetra- | | | | | | |
| Ex. No. | epoxy resin | methyl ammonium metha- crylate | methanol | total radia- tion (Mrad) | percent conver- sion of monomer | nonvol- atiles cont. | par- ticle size (μm) | vis- cos- ity (cP) |
| --- | --- | --- | --- | --- | --- | --- | --- | --- |
| 1 | 100 | 7.9 | 10 | 15 | 95 | 20 | 0.14 | 20.1 |

TABLE 1-continued

| | composition (g) | | | | properties of dispersions | | |
|---|---|---|---|---|---|---|---|
| Ex. No. | epoxy resin | tetra-methyl ammonium metha-crylate | methanol | total radiation (Mrad) | percent conversion of monomer | nonvolatiles cont. | particle size ($\mu$m) | viscosity (cP) |
| 2 | 100 | 4.6 | 10 | 18 | 93 | 20 | 0.18 | 17.8 |

(Note: header row has 9 columns — Ex. No., epoxy resin, tetramethyl ammonium methacrylate, methanol, total radiation (Mrad), percent conversion of monomer, nonvolatiles cont., particle size ($\mu$m), viscosity (cP))

EXAMPLE 3

A 300-ml four-necked glass flask equipped with a stirrer, a nitrogen gas introducing pipe, a thermometer and a cooling pipe was charged with 70 g of an epoxy resin (Epikote 1007 of Shell Chemical Co.), 14.8 g of styrene, 9.7 g of methyl acrylate and 1.0 g of methacrylic acid, and the respective components were stirred at 68° C. for about one hour until a uniform mixture formed. While the reaction vessel was cooled with water, 4.5 g of tetramethyl ammonium methacrylate and 5 g of methanol were added and the entire system was stirred at 20° C. in a nitrogen gas atmosphere for about 30 minutes to obtain a highly viscous fluid wherein the epoxy resin was intimately mixed with the monomers. The mixture was poured onto a 100$\mu$ thick polyester film placed on a flat plate. Another polyester film was placed on the mixture which was subsequently shaped into a circular sheet of 2 mm thickness by pressing with a metal plate from the top. The sheet of the mixture as sandwiched between the polyester films was place on an ice bath and polymerized by irradiation with 36 Mrad of an electron beam from a Dynamitron (radiation energy: 2 MeV, current: 6 mA).

COMPARATIVE EXAMPLE 1

A uniform mixture of 70 g of Epikote 1007, 12.0 g of styrene, 8.0 g of methyl acrylate and 10.0 g of methacrylic acid was prepared as in Example 3, and it was polymerized by irradiation with 12 Mrad of an electron beam under the same conditions as used in Example 3.

COMPARATIVE EXAMPLE 2

The same flask as used in Example 3 was charged with Epikote 1007 and the monomers used in Comparative Example 1, as well as 49 g of a butanol-cyclohexanone-butyl cellosolve solvent (2:1:1 by wt) and 3 g of benzoyl peroxide (BPO), and the respective components were mixed under stirring at 116° C. for 3 hours. After adding an additional 25 g of BPO the reaction mixture was further stirred at 116° C. for 3 more hours to complete the graft polymerization.

The efficiency of monomer grafting to the epoxy resin was checked for each sample by gel permeation chromatography. The results are shown in Table 2.

TABLE 2

| Sample | grafting efficiency (%) |
|---|---|
| Ex. 3 | 30 |
| Comp. Ex. 1 | 32 |
| Comp. Ex. 2 | 3 |

This data shows that irradiating a mixture of the epoxy resin and graft monomers with an electron beam is an effective method to produce a modified water-dispersible resin.

EXAMPLE 4

The sample prepared in Example 3 was comminuted into fine particles having a diameter of about 1 mm or less. Twenty grams of the powder was put in a 200-ml jar on a water bath (ca. 20° C.) and mixed with 14 g of a butanol-cyclohexanone-butyl cellosolve (ethylene glycol monobutyl ether) solvent (2:1:1 by wt) for 2 hours under stirring. Then, 66 g of water was gradually added to the resulting solution with stirring. An aqueous dispersion was prepared from the mixture by vigorous stirring.

The sample of Comparative Example 1 was comminuted and dissolved in a mixed solvent of butanol, cyclohexanone and butyl cellosolve as above. Thereafter, 3.6 g of 15% dimethylaminoethanol was added to neutralize part of the acid equivalent to the amount of the tetramethyl ammonium methacrylate used in Example 3. Then, 62.4 g of water was gradually added to the mixture under stirring. An aqueous dispersion was prepared from the mixture by vigorous stirring.

The size of the particles in each aqueous dispersion was determined. Also, its long-term was stability checked under an electron microscope. The results are shown in Table 3.

TABLE 3

| Sample | nonvolatiles cont. (%) | max. and min. particle size ($\mu$m) | ave. size ($\mu$m) | precipitation after 1 month standing at room temp. |
|---|---|---|---|---|
| Ex. 3 | 20 | 0.20–0.15 | 0.17 | no |
| Comp. Ex. 1 | 20 | 0.55–0.15 | 0.25 | yes |

The above data shows that an epoxy resin latex comprising small particles with a narrow size distribution and having high long-term stability can be produced by grafting to an epoxy resin a tetramethyl ammonium salt of methacrylic acid that corresponds to a neutralized salt of $\alpha,\beta$-unsaturated carboxylic acid.

EXAMPLES 5 AND 6 AND COMPARATIVE EXAMPLES 3 AND 4

Water-dispersible epoxy resin compositions were prepared from the formulations indicated in Table 4 by repeating the procedure of Example 3. They were then dispersed in water to produce aqueous dispersions. The degree of neutralization of tetramethyl ammonium methacrylate used in Comparative Examples 3 and 4 was 90%. The properties of the dispersions and the results of their standing at room temperature are listed in Table 4.

TABLE 4

| Sample | Composition (g) | | | | | | total dose of radiation (Mrad) | av. particle size ($\mu$) | relative stability in electrolyte[b] (PH = 6.11) | precipitation after 1 month standing |
| --- | --- | --- | --- | --- | --- | --- | --- | --- | --- | --- |
| | epoxy resin | styrene | methyl acrylate | methacrylic acid | tetramethyl ammonium methacrylate | methanol | | | | |
| Ex. 5 | 70 | 13.4 | 8.9 | 2.2 | 5.5[a] (3.5 × 10$^{-4}$) | 5.0 | 36 | 0.13 | 1.4 | no |
| Ex. 6 | 70 | 12.4 | 8.2 | 2.6 | 6.8[a] (4.3 × 10$^{-4}$) | 5.0 | 33 | 0.10 | 1.8 | no |
| Comp. Ex. 3 | 70 | 12.0 | 15.0 | 3.0 (3.1 × 10$^{-4}$) | — | — | 30 | 0.19 | 0.7 | yes |
| comp. Ex. 4 | 70 | 15.0 | 10.0 | 5.0 (5.2 × 10$^{-4}$) | — | — | 24 | 0.17 | 1.1 | yes |

[a]The figures in parentheses indicate the concentrations (mol/g-resin) of dissociated hydrophilic monomers in resins.
[b]Relative values indicating the stability of latices against agglomeration in solutions with NaCl content of 0.5 mol/1,000 ml.

The data in Table 4 shows the following:
1. If the concentration of a hydrophilic monomer dissociated in a resin is the same, an epoxy resin latex comprising smaller particles and having better stability to storage and electrolyte can be obtained by grafting tetramethyl ammonium methacrylate onto the epoxy resin;
2. By varying the concentration of the tetramethyl ammonium methacrylate to be grafted, the particle size of the latex can be controlled without impairing its stability. These observation enable us to conclude that tetramethyl ammonium salts of carboxylic acids will prove effective in preparing a stable aqueous dispersion of the epoxy resin.

EXAMPLE 7

The epoxy resin latex prepared in Example 5 by grafting tetramethyl ammonium methacrylate onto an epoxy resin and the one prepared in Comparative Example 3 by grafting methacrylic acid onto an epoxy resin were spread on glass plates, preliminarily dried at 50° C. for 10 minutes, and then cured at 110° C. or 130° C. for the periods indicated in Table 5. The cured samples were peeled off the glass plates and put in a basket made of metal gauze (200 mesh), which was immersed in boiling dioxane for 16 hours. After recovering the basket from the dioxane, the samples were washed with methanol and the amounts of the insolubles were measured. The results are shown in Table 5, from which one can see that by grafting tetramethyl ammonium methacrylate, the rate of epoxy resin curing was accelerated to such an extent that a highly cross-linked product could be produced by curing at 110° C. for 30 minutes or at 130° C. for 10 minutes. In other words, a medium-temperature, self-curing epoxy resin composition can be produced by grafting tetramethyl ammonium methacrylate onto an epoxy resin.

TABLE 5

| | Curing temp. & time vs. gel fraction profile | | | | |
| --- | --- | --- | --- | --- | --- |
| | gel fraction (%) | | | | |
| | 110° C. | | | 130° C. | |
| Sample | 10 min | 20 min | 30 min | 10 min | 20 min |
| Example 5 | 36.7 | 61.5 | 73.9 | 81.4 | — |
| Comp. Ex. 3 | 21.8 | 34.5 | 46.0 | 40.0 | 47.0 |

EXAMPLE 8

Seventy grams of an epoxy resin (Epikote 1009 by Shell Chemical Co.), 140.0 g of styrene, 9.3 g of methyl acrylate, 6.7 g of tetramethyl ammonium itaconate and 5 g of methanol were thoroughly blended as in Example 1 to prepare a homogeneous high-viscosity fluid. The mixture was poured onto a 100$\mu$ thick polyester film placed on a flat plate. Another polyester film was placed on the mixture which was subsequently shaped into a circular sheet of 2 mm thickness by pressing with a metal plate from the top. The sheet of the mixture as sandwiched between the polyester films was placed on an ice bath and polymerized by irradiation with 30 Mrad of an electron beam from a Cockcroft-Walton machine (radiation energy: 2 MeV, current: 6 mA) to form a solid product. The solid epoxy resin was ground into particles no larger than 1 mm in size. Twenty grams of the powder was put in a 200-ml jar on a water bath and mixed with 14 g of a butanol-cyclohexanone-butyl cellosolve (2:1:1 by wt). Under stirring, 66 g of water was gradually added to the resulting solution. An aqueous dispersion was prepared from the mixture by subsequent vigorous stirring. The latex contained 20% of the nonvolatiles, comprised particles of a size of 0.12$\mu$ and had a viscosity of 13 cP (30-C). It was left to stand at room temperature for one month, without forming a precipitate.

EXAMPLE 9

A mixture of 70 g of liquid epoxy resin (Epikote 828 by Shell Chemical Co.), 13.4 g of styrene, 8.8 g of methyl acrylate, and 7.8 g of monobutyl tetramethyl ammonium itaconate was charged into a four-necked glass flask on a water bath that was equipped with a stirrer, a condenser, a thermometer and a nitrogen introducing pipe. By stirring the mixture for 3 hours, a viscous uniform dispersion of monobutyltetramethyl ammonium itaconate was obtained. The dispersion was sandwiched between polyester films 0.1 mm thick and shaped into a thin sheet. While cooling at −30° C., the sheet was irradiated with an electron beam from a Cockcroft Walton machine (radiation energy: 2 MeV, current: 6 mA) to form a solid resin. Twenty grams of the resin was put in a 200-ml jar and mixed with 14 g of a butanolcyclohexanone-butyl cellosolve (2:1:1 by wt) under stirring. To the resulting solution, 66 g of water was gradually added under continued stirring. An aqueous dispersion was prepared from the mixture by subsequent vigorous stirring. The latex contained 20% of the nonvolatiles, comprised particles of a size 0.17$\mu$ and had a viscosity of 25 cP (30° C.). It was left to stand at room temperature for one month, without forming a precipitate.

EXAMPLE 10

A four-necked glass flask of the same type as used in Example 3 was charged with 70 g of an epoxy resin (Epikote 1007), 5 g of styrene, 5 g of methacrylic acid, 10 g of 2-hydroxyethyl acrylate and 10 g of ethyl acrylate. The mixture was stirred at 68° C. for one hour to make a highly viscous, uniform fluid. While cooling the reaction vessel at −30° C. or below, 5.2 g of dimethylaminoethanol and 10 g of ethanol were added to the reaction mixture, which was stirred in a nitrogen atmosphere for about 30 minutes until the methacrylic acid was completely neutralized and became an integral part of the mixture. The mixture was sandwiched between two square polyester films 0.1 mm thick and 30 cm on both sides and shaped into a circular sheet 2 mm thick. The sheet of the mixture was cooled at 0° C. as it was irradiated with an electron beam from a Dynamitron (radiation energy: 1.5 MeV, current: 5 mA) to form a solid product. The degree of polymerization of the monomers was 89.7% and no gel formation was detected. The solid polymer was ground into particles of a size less than 1 mm and dissolved in 70 phr of a mixed solvent of butyl cellosolve, cyclohexane and butanol (2:1:1 by wt). To the resulting solution, 605 phr of purified water was added under stirring. An aqueous dispersion was prepared from this mixture by subsequent vigorous stirring. The dispersion had an nonvolatiles content of 12.9% and a viscosity of 90 cP (25° C.) and comprised particles of a size 0.12 μm. After one-month standing at room temperature, the solubility of the latex in THF remained the same and no gel formed. The latex was spread on a glass plate and cured at 150° C. for 10 minutes. The resulting gel fraction was 87.8%. A control latex was prepared from a polymer wherein the methacrylic acid was neutralized with diethylaminoethanol after irradiation with an electron beam. The gel fraction of that latex was 65.4%. This shows that a highly stable latex comprising fine particles and which has good self-curing properties can be produced by neutralizing a monomer acid before irradiation with an electron beam.

What is claimed is:

1. A self-curing resin composition produced by irradiating with an electron beam a mixture of 85 to 97 wt% of an epoxy resin and 3 to 15 wt% of a quaternary alkyl ammonium salt of an α,β-unsaturated carboxylic acid.

2. A self-curing resin composition produced by irradiating with an electron beam a mixture of 85 to 97 wt% of an epoxy resin and 3 to 15 wt% of a neutralized product of an α,β-unsaturated carboxylic acid prepared by mixing it with a tertiary amine.

3. A self-curing resin composition produced by irradiating with an electron beam a mixture of 50 to 97 wt% of an epoxy resin, 3 to 15 wt% of a quaternary alkyl ammonium salt of α,β-unsaturated carboxylic acid, and an effective amount not more than 47 wt. % of a polymerizable monomer which has one ethylenically unsaturated bond and which promotes dissolution of said salt in said epoxy resin.

4. A self-curing resin composition produced by irradiating with an electron beam a mixture of 50 to 97 wt % of an epoxy resin, 3 to 15 wt% of a neutralized product of an α,β-unsaturated carboxylic acid prepared by mixing it with a tertiary amine, and an effective amount not more than 47 wt. % of a polymerizable monomer which has one ethylenically unsaturated bond and which promotes dissolution of said neutralized product in said epoxy resin.

5. An aqueous dispersion produced by first dissolving 100 parts by weight of a resin composition according to claim 1 in 30 to 200 parts by weight of an organic solvent, adding to the resulting solution 100 to 700 parts by weight of water per 100 parts by weight of the resin composition, and stirring the mixture until it becomes homogeneous.

6. A resin composition according to claim 1 wherein the epoxy resin, the quaternary ammonium salt or neutralized product of an α,β-unsaturated carboxylic acid, and the ethylenically unsaturated monomer are mixed in the presence of an amount effective of an organic solvent to achieve uniform mixing.

7. A resin composition according to claim 1 wherein the mixture is irradiated at between −50° and 50° C. with an electron beam at a dose rate of $1 \times 10^4$ to $3 \times 10^7$ rad/sec to give a total dose of 5 to 50 Mrad.

8. An aqueous dispersion produced by first dissolving 100 parts by weight of a resin composition according to claim 2, in 30 to 200 parts by weight of an organic solvent, adding to the resulting solution 100 to 700 parts by weight of water per 100 parts by weight of the resin composition, and stirring the mixture until it becomes homogeneous.

9. An aqueous dispersion produced by first dissolving 100 parts by weight of a resin composition according to claim 3, in 30 to 200 parts by weight of an organic solvent, adding to the resulting solution 100 to 700 parts by weight of water per 100 parts by weight of the resin composition, and stirring the mixture until it becomes homogeneous.

10. An aqueous disperson produced by first dissolving 100 parts by weight of a resin composition according to claim 4, in 30 to 200 parts by weight of an organic solvent, adding to the resulting solution 100 to 700 parts by weight of water per 100 parts by weight of the resin composition, and stirring the mixture until it becomes homogeneous.

11. A resin composition according to claim 2, wherein the epoxy resin, the quaternary ammonium salt or neutralized product of an α,β-unsaturated carboxylic acid, and the ethylenically unsaturated monomer are mixed in the presence of an effective amount of an organic solvent to achieve uniform mixing.

12. A resin composition according to claim 3, wherein the epoxy resin, the quaternary ammonium salt or neutralized product of an α,β-unsaturated carboxylic acid, and the ethylenically unsaturated monomer are mixed in the presence of an effective amount of an organic solvent to achieve uniform mixing.

13. A resin composition according to claim 4, wherein the epoxy resin, the quaternary ammonium salt or neutralized product of an α,β-unsaturated carboxylic acid, and the ethylenically unsaturated monomer are mixed in the presence of an effective amount of an organic solvent to achieve uniform mixing.

14. A resin composition according to claim 2, wherein the mixture is irradiated at between −50° and 50° C. with an electron beam at a dose rate of $1 \times 10^4$ to $3 \times 10^7$ rad/sec to give a total dose of 5 to 50 Mrad.

15. A resin composition according to claim 3, wherein the mixture is irradiated at between −50° and 50° C. with an electron beam at a dose rate of $1 \times 10^4$ to $3 \times 10^7$ rad/sec to give a total dose of 5 to 50 Mrad.

16. A resin composition according to claim 4, wherein the mixture is irradiated at between −50° and 50° C. with an electron beam at a dose rate of $1 \times 10^4$ to $3 \times 10^7$ rad/sec to give a total dose of 5 to 50 Mrad.

* * * * *